(12) United States Patent
Iyi et al.

(10) Patent No.: US 8,435,910 B2
(45) Date of Patent: May 7, 2013

(54) PREPARATION METHOD FOR ANION-EXCHANGEABLE, LAYERED DOUBLE HYDROXIDES

(75) Inventors: Nobuo Iyi, Tsukuba (JP); Takayoshi Sasaki, Tsukuba (JP)

(73) Assignee: National Institute for Materials Science, Tsukuba-Shi (JP)

( * ) Notice: Subject to any disclaimer, the term of this patent is extended or adjusted under 35 U.S.C. 154(b) by 258 days.

(21) Appl. No.: 12/734,955

(22) PCT Filed: Dec. 2, 2008

(86) PCT No.: PCT/JP2008/071869
§ 371 (c)(1),
(2), (4) Date: Jul. 2, 2010

(87) PCT Pub. No.: WO2009/072488
PCT Pub. Date: Jun. 11, 2009

(65) Prior Publication Data
US 2010/0279848 A1 Nov. 4, 2010

(30) Foreign Application Priority Data

Dec. 5, 2007 (JP) .................................. 2007-314339
May 1, 2008 (JP) .................................. 2008-119873

(51) Int. Cl.
*B01J 21/16* (2006.01)
(52) U.S. Cl.
USPC ............................. 502/84; 502/11; 423/420.2
(58) Field of Classification Search ................ 423/420.2; 502/11, 84
See application file for complete search history.

(56) References Cited

PUBLICATIONS

Water-Swellable MgAl-LDH (Layered Double Hydroxide) Hybrids: Synthesis, Characterization, and Film Preparation Nobuo Iyi, Yasuo Ebina, and Takayoshi Sasaki Langmuir 2008 24 (10), 5591-5598.*
"Table of Ka Values for Common Monoprotic Acids". Brewton-Parker College. Updated on: Apr. 15, 2010 <http://www.bpc.edu/mathscience/chemistry/table_of_monoprotic_acids.html> Accessed Apr. 17, 2012.*

(Continued)

*Primary Examiner* — Daniel C McCracken
*Assistant Examiner* — Richard M Rump
(74) *Attorney, Agent, or Firm* — Manabu Kanesaka

(57) ABSTRACT

The invention has for its object to provide a preparation method for preparing an anion-exchangeable LDH by decarbonation of a carbonate ion type LDH, which makes sure de carbonation is implemented with safety in a continuous manner while crystal shape, crystal structure and crystallinity are kept intact.

The invention provides a preparation method for preparing an anion-exchangeable, layered double hydroxide wherein a carbonate ion type layered double hydroxide (LDH) having a composition represented by a general formula: $Q_xR(OH)_z(CO_3^{2-})_{0.5-y/2}(X^-)_y.nH_2O$ where x is indicative of a numeral range of $1.8 \leqq x \leqq 4.2$; z is indicative of $2(x+1)$; y is indicative of a minimum value of at least 0 that increases to less than 1 when anions ($X^-$) remain or a part of anions is introduced; Q is a divalent metal ion; R is a trivalent metal ion; and n is $2\pm 2$ is used as a starting material, and y in said general formula increases to a maximum of 1 by substitution of a minus monovalent anion ($X^{-1}$) at a carbonate ion site thereby implementing substitution, characterized in that the starting material is dispersed in an aqueous solution mixed with a salt containing minus monovalent anions ($X^-$) in an amount enough for substitution at the carbonate ion site while said aqueous solution is kept at a pH (hydrogen ion exponent) of greater than 4 to less than 7.

6 Claims, 9 Drawing Sheets

PUBLICATIONS

Iyi et al. :Effects of Anion Species on Deintercalation of Carbonate Ions from Hydrotalcite-like Compounds. Chemistry Leetters. vol. 34 No. 7 (2005).*

"Decarbonation of MgAl-LDHs (Layered double hydroxides) using acetate-buffer/NaCl mixed solution" Nobuo Iyi and Takayoshi Sasaki; National Institute for Materials Science (NIMS), Journal of Colloid and Interface Science 322 (2008) 237-245.

"Deintercalation of Carbonate Ions from a Hydrotalcite-Like Compound: Enhanced Decarbonation Using Acid-Salt Mixed Solution" Nobuo Iyi, Taki Matsumoto, Yoshiro Kaneko, and Kenji Kitamura; Advanced Materials Laboratory, National Institute for Materials Science (NIMS); Chemistry of Materials, Reprinted from vol. 16, No. 15, pp. 2926-2932.

"Anion-exchange in takovite: applications to other hydroxide minerals" by David L. Bish; Department of Geosciences, The Pennsylvania State University, Bull Mineral. (1980). 103,170-175.

* cited by examiner

PREPARATION METHOD FOR ANION-EXCHANGEABLE, LAYERED DOUBLE HYDROXIDES

RELATED APPLICATIONS

The present application is National Phase of International Application No. PCT/JP2008/071869 filed on Dec. 2, 2008, and claims priority from Japanese Applications, No. 2007-314339 filed on Dec. 5, 2007 and No. 2008-119873 filed on May 1, 2008 the disclosure of which is hereby incorporated by reference herein in its entirety.

ART FIELD

The present invention relates to an anion-exchangeable, layered double hydroxide (hereinafter referred simply to as LDH) obtained by decarbonation of the starting material: an LDH having difficult-to-anion exchange carbonate ions ($CO_3^{2-}$) between layers, and a preparation method using the decarbonation.

BACKGROUND ART

So far, a lot of layered compounds have been developed by using layered compounds such as clay minerals to include a variety of cation or cationic functional organic materials in them. This has made use of the fact that layers of clay mineral have negative charges so that interlayer cations are susceptible of ion exchange. Unlike clay minerals, LDHs have positive charges on layers and anions between layers, and so have anion exchangeability. Typical of naturally occurring minerals is hydrotalcite ($Mg_3Al(OH)_8(CO_3^{2-})_{0.5} \cdot 2H_2O$). Inorganic anion exchangeable materials are much more limited in type than cation exchangeable compounds, and LDHs have attracted attention in this respect (Non-Patent Publication 1).

LDHs inclusive of hydrotalcite often contain carbonate ions between layers, primarily because carbonate ions have much stronger affinity for LDHs than other anions (Non-Patent Publication 2). For this reason, an LDH (of the carbonate ion type) containing carbonate ions is very low in ion exchangeability, and anion exchange hardly takes place under ordinary conditions: it has very limited use as an anion exchange agent.

Generally, an LDH is synthesized by coprecipitation reactions wherein aqueous solutions of a magnesium salt and an aluminum salt are mixed together while an aqueous solution of sodium hydroxide is kept at a pH of about 10. In this case, if anions other than carbonate ions (for instance, nitrate or chlorine ions) are allowed to coexist, it is then possible to synthesize LDHs containing easy-to-exchange anions. However, the reactions involved must be carried out using carbon dioxide-free, degassed distilled water or an alkali reagent in a carbon dioxide-free atmosphere such as a nitrogen stream. Steps of separation by filtration and drying, too, must be all implemented in a carbon dioxide-free atmosphere. Further, because synthesis conditions vary depending on the type of anions, there is much difficulty in the optimization of synthesis conditions and indeed, LDHs synthesized of any other type are found to be poor in crystallinity (Non-Patent Publication 3).

Recently, LDHs having uniform grain diameter and large yet controlled crystal diameter have been synthesized by carrying out uniform nucleation using a reagent that emits out ammonia in hot water, especially urea, and hexamethylenetetramine. However, the LDHs obtained in this case are only of the carbonate ion type (Non-Patent Publications 4, 5 and 6).

There is also an alternative method harnessing structural changes in association with heating. More specifically, the application of heat of about 500° C. causes hydrotalcite to change in structure for decarbonation; however, it has been known that if the obtained product is put in an aqueous solution containing anions other than carbonate ions (e.g., nitrate ions, and chlorine ions), an LDH containing those anions is then reconstructed (Non-Patent Publication 7). Using this "reconstruction", any desired anions are included between layers for synthesis of a nano-layered compound in which functional molecules or organic materials are included between layers at a nano-level. Due to structural changes caused by heating, however, the reconstructed product is far away from the starting material, leading to problems such as decreased crystallinity after repeated reconstruction (Non-Patent Publication 8), and changes in terms of crystal shape, grain diameter, homogeneity, and composition (Non-Patent Publication 9). Decarbonation requires a several-hour heating at temperatures as high as 500° C., which would be impractical from both energy and time considerations.

The carbonate ion type is easy to synthesize and indeed, most of the industrially produced LDHs are of this carbonate ion type. If the LDHs of the carbonate ion type can be converted by a simple chemical method into anion exchangeable LDHs that contain easy-to-ion exchange anions (e.g., nitrate ions, and chlorine ions), then they could be extended to a wide of applications industrially as well as at research and testing levels.

For instance, one LDH application is to entrap carbon dioxide ($CO_2$). Carbon dioxide is a grave factor responsible for global warming, and entrapping $CO_2$ emissions is of great importance as well known in the art. Having been studied so far for the purpose of entrapping $CO_2$, LDHs are typical of inorganic $CO_2$-fixation materials. For entrapping of $CO_2$, there is a product used which is obtained from hydrotalcite structurally changed and decarbonated by heating of the order of 500° C. As already mentioned, this makes use of the "reconstruction" phenomenon, but does not gain popularity as an effective process for the reason of demerits in consideration of energy and time, because decarbonation requires high temperatures. LDHs of the carbonate ion type occurring by reactions with $CO_2$ cannot be recycled unless again decarbonated by heating of the order of 500° C.; they have been considered as only a fixation material chiefly for fixing and throwing away $CO_2$.

For repeated separation and recovery of $CO_2$ instead of such fixation that does not allow for recycling, for instance, a chemical absorption method using alkanolamines is now under study. However, the gravest problem with that approach was that a temperature on the order of 100° C. is needed for recovery of $CO_2$ (Non-Patent Publication 11). If this decarbonation is achievable under mild conditions such as room temperature and by a simple chemical method, and if an LDH containing easy-to-anion exchange anions (e.g., nitrate ions, and chlorine ions) is obtained by conversion for repeated use, it could provide a very promise candidate for materials capable of separating off and recovering $CO_2$.

Another possible application of LDHs is that their anion exchangeability is used for separation and recovery of harmful or useful anions from in water. As already reported in the art, anion exchangeability has attracted attention and been studied about affinity order (Non-Patent Publication 2). As a matter of course, this may be used to entrap harmful or useful anions in water and indeed, how to remove phosphorus components from in water using LDHs has been proposed. Referring to regeneration of LDHs turning into the carbonate ion type, however, there has been only an inefficient process proposed, in which after "reconstruction" relying upon heating of LDH on the order of 500° C. or complete dissolution of LDH, that LDH is again synthesized by "coprecipitation" (Patent Publication 1). If the LDH can be readily converted into an easy-to-anion exchange LDH, it is then possible to separate off and recover harmful or useful anions from water: these anions trapped in the LDH can be treated with carbonate ions for recovery. And the LDH changed into the carbonate ion type is regenerated by a simple de-carbonation operation into an easy-to-anion exchange LDH for repeated use, which would be a very promising candidate for materials capable of separating off and recovering harmful or useful anions.

Yet another possible LDH application is filler that can make improvements in the mechanical strength of general-purpose polymers. Two-dimensional layer-containing compounds such as clay minerals are used for the filler, but there are still problems such as incomplete exfoliation of layers, and an insufficient affinity for matrixes; there is still much left to be desired in terms of dispersibility, etc. Unlike clay minerals, LDH's layers are so of cationic nature that anionic monomers, for which clay does not work, can be included in them. If the monomers can be included between layers to trigger reactions, it then may be applied to high molecules for which clay minerals cannot be used, and may possibly be extended to even foliation of layers, resulting in some considerable improvements in mechanical strength, gas barrier properties, etc. (Non-Patent Publications 12 and 13).

Thus, if a carbonate ion type LDH can be converted by a simple chemical method into an easy-to-anion exchange LDH, it could then proffer breakthroughs from a lab level to an industrial level as well as in a wider range from environmental problems to nanotechnologies (Non-Patent Publication 14).

We have already discovered that upon action of a hydrochloric acid/NaCl (sodium chloride) mixed solution on a carbonate ion type LDH at room temperature, de-carbonation occurs, resulting in conversion into an LDH containing the added anions, and filed a patent application for it. XRD diffraction, observation under SEMs (scanning electron microscopes), and gravimetric analysis has revealed that if this decarbonation method is implemented under the optimized conditions, crystal shape, crystal structure and crystallinity are kept intact with no or little weight change due to dissolution (Non-Patent Publications 15 and 16, and Patent Publication 2).

However, this method using a hydrochloric acid/NaCl mixed solution has some problems stemming from the fact that the solution is of strong acidity. Originally, LDHs are vulnerable to acids, and they dissolve by themselves in a low pH (hydrogen ion exponent) state (of weak acidity). In actual measurements, LDHs dissolve visibly in a pH state of less than 4 upon only a few-hour contact with the solution. When it comes to the most general anion exchange process, for instance, a column in which an anion exchange material is filled in a continuous manner, it is not always in uniform contact with the solution. In industrial applications where mass processing is in need and a continuous rather than batch process is in need, it is important to keep the pH as close to neutrality as possible, and keep the pH against changes due to reactions. It goes without saying that a solution of pH=1 to 2 is of so strong acidity that meticulous care should be taken of handling, and there is a corrosion problem as well with equipments for using volatile acids such as hydrochloric acid.

Thus, the decarbonation method relying on a hydrochloric acid/NaCl mixed solution provides an epoch-making method for synthesizing an LDH containing easy-to-ion exchange anions (e.g., nitrate ions, and chlorine ions) by a simple chemical method yet without affecting grain diameter and homogeneity, but there are still problems stemming from the fact that there is an aqueous solution of strong acidity used, and to allow it to be used in a wider range of industrial applications, much more improvements must be made.

Listing of the Patent, and Non-Patent Publications

Patent Publication 1: JP(A) 2001-187336
Patent Publication 2: JP(A) 2005-255441
Patent Publication 3: JP(A) 2007-31189 (see paragraph [0052])
Non-Patent Publication 1: Cavani, F., Trifiro, F., Vaccari, A., Catal. Today 11, 173-301 (991)
Non-Patent Publication 2: Miyata, S., Clays Clay Miner. 31, 305-311 (1983)
Non-Patent Publication 3: Reichle, W. T., Solid States Ionics 22, 135-141 (1986)
Non-Patent Publication 4: Costantino, U., Marmottini, F., Nochetti, M., Vivani, R., Eur. J. Inorg. Chem. 1439-1446 (1998)
Non-Patent Publication 5: Ogawa, M., Kaiho, H., Langmuir 18, 4240-4242 (2002)
Non-Patent Publication 6: Iyi, N., Matsumoto, T., Kaneko, Y., Kitamura, K., chem. Lett. 33, 1122-1123 (2004)
Non-Patent Publication 7: Hibino, T., Yamashita, Y., Kosuge, K., Caly Clay Miner. 43, 427-432 (1995)
Non-Patent Publication 8: Hibino, T., Tsunashima, A., Chem. Mater. 10, 4055-4061 (1998)
Non-Patent Publication 9: Stanimirova, T. S., Kirov, G., Dinolova, E., J. Mater. Sci. Lett. 20, 453-455 (200)
Non-Patent Publication 10: Suzuki, M. "Isolation of $CO_2$ by Minerals" ("State of the Art for Fixation and Isolation of $CO_2$" edited by Inui, T., pp. 124-135), CMC (2000)
Non-Patent Publication 11: Matsumoto, K., "Carbonic Acid Gas Separation Technology by Chemical Adsorption" ("State of the Art for Fixation and Isolation of $CO_2$" edited by Inui, T., pp. 87-97), CMC (2000)
Non-Patent Publication 12: Leroux, F.; Besse, J.-P., Chem. Mater. 13, 3507-3515 (2001)
Non-Patent Publication 13: Newman, S. P., Jones, W., New J. Chem. 22, 105-115 (1998)
Non-Patent Publication 14: Khan, A. I., O'Hare, D. J., J. Mat. Chem. 12, 3191-3198 (2002)
Non-Patent Publication 15: Iyi, N., Matsumoto, T., Kaneko, Y., Kitamura, K., Chem. Mater. 16, 2926-2932 (2004)
Non-Patent Publication 16: Iyi, N., Okamoto, K., Kaneko, Y., Matsumoto, T., Chem. Lett. 34, 932-933 (2005)
Non-Patent Publication 17: Okamoto, K., Sasaki, T., Fujita, T., Iyi, N., J. Mater. Chem., 16, 1608-1616 (2006) (see paragraph [0052])

DISCLOSURE OF THE INVENTION

Object of the Invention

The situations being like this, an object of the invention is to provide a preparation method for an anion-exchangeable LDH by decarbonation of a carbonate ion type LDH, which can be implemented with safety and reliability in a continuous manner while keeping crystal shape, crystal structure and crystallinity intact.

Means for Accomplishing the Object

To accomplish the aforesaid object, the present invention is embodied as follows.

Invention 1 provides a preparation method for an anion-exchangeable, layered double hydroxide, wherein a carbonate ion type layered double hydroxide (LDH) having a composition represented by General Formula: $Q_xR(OH)_z(CO_3^{2-})_{0.5-y/2}(X^-)_y \cdot nH_2O$ where x is indicative of a numeral range of $1.8 \leq x \leq 4.2$; z is indicative of $2(x+1)$; y is indicative of a minimum value of at least 0 that increases to less than 1 when anions ($X^-$) remain or a part of anions is introduced; Q is a divalent metal ion; R is a trivalent metal ion; and n is $2\pm2$ is used as a starting material, and y in said general formula increases to a maximum of 1 by substitution of a minus monovalent anion ($X^{-1}$) at a carbonate ion site, characterized in that: said starting material is dispersed in an aqueous solution mixed with a salt containing minus monovalent anions ($X^-$) in an amount enough for substitution at the carbonate ion site thereby implementing substitution while said aqueous solution is kept at a pH (hydrogen ion exponent) of greater than 4 to less than 7.

It is here noted that n is set at $n=2\pm2$, because n changes with an environmental humidity and generally takes a value of approximately 2 at room temperature with a humidity of about 60% RH; however, n gets close to 0 at a humidity of 0% RH and takes a value of 3 to 4 at a humidity of about 95% RH.

Invention 2 is characterized in that in the preparation method of Invention 1, said pH is regulated by mixing a buffer comprising an acid and its conjugate base or by supplying an acid.

Invention 3 is characterized in that in the preparation method of Invention 2, said acid is acetic acid.

Invention 4 is characterized in that in the preparation method of any one of Inventions 1, 2 and 3, the minus monovalent anion ($X^-$) is a chlorine ion.

Invention 5 is characterized in that in the preparation method of any one of Inventions 1 to 4, said aqueous solution is at a temperature from room temperature to a temperature less than 100° C.

Invention 6 is characterized in that in the preparation method of any one of Inventions 1 to 5, the divalent metal ion Q in said general formula is at least one metal ion selected from the group consisting of Mg, Mn, Fe, Co, Ni, Cu, Zn, and Ca, and the trivalent metal ion R in said general formula is at least one metal ion selected from the group consisting of Al, Ga, Cr, Mn, Fe, Co, Ni, and La.

Advantages of the Invention

According to the invention, it has been found that LDHs dissolve in the aqueous solution at a pH of not greater than 4.0, but do not at a pH exceeding that. It has also been found that decarbonation occurs even without allowing the aqueous solution to keep strong acidity.

According to the invention based on such findings, the aforesaid embodiments are used thereby providing a method that can stand up to industrial mass production.

Further, a possible reason for the mechanism described in Patent Publication 2 could be that protons in hydrochloric acid react with carbonate ions between layers into hydrogencarbonate ions that bring about a change in ion exchangeability and shift equilibrium in such a direction that chlorine ions enter them, with the result that there are decarbonation reactions occurring, leading to an LDH containing chlorine ions. And why the hydrochloric acid/NaCl mixed solution used for de-carbonation is of strong acidity is that all the protons necessary for it are present from the start in the system involved. This has led to an idea that if, like a buffer, protons are released from the solution in such a way as to make up for proton consumptions, there is no need of all protons being present from the start: decarbonation might occur under weakly acidic conditions and more mildly, arriving at the instant invention.

The instant invention overcomes the defects of the already developed decarbonation method relying upon a hydrochloric acid/NaCl mixed solution, successfully providing a simple method for decarbonation of LDHs having carbonate ions between layers. The instant invention has thus some considerable advantages inclusive of:

1) the acetic acid buffer/NaCl solution that is a decarbonation solution has a weakly acidic pH of greater than 4 to less than 7 with no or little LDH dissolution, making sure handleability with greater safety;

2) all the reagents are readily available at low prices, and of neither toxicity nor risk at all;

3) pH changes upon reactions are very limited down to about 0.5; and 4) the necessary concentration of NaCl too is as low as 4% by weight, a figure about ⅕ times as much as that in the hydrochloric acid/NaCl method so that reactions occur at a NaCl concentration somewhat higher than that of seawater. These advantages make continuous operation feasible, and help lift quantitative restrictions off LDHs and the buffer, making sure a wider tolerance range. Thus, the instant invention is well-suited for industrial applications with great significance.

The thus obtained easy-to-anion exchange LDHs readily exchange through anion exchange with various inorganic or organic anions. For this reason, they could be applied to the synthesis of novel functional layered compounds by introduction of anionic, functional molecules, separation and recovery of harmful anions or resourceful anions from in water, adsorption and recovery of carbon dioxide, etc.: they could further be extended to environmental problems fields, and to a new applied field such as construction of nanodevices as well.

BRIEF EXPLANATION OF THE DRAWINGS

In FIG. 1, AcOH and AcONa are the acronyms of acetic acid and sodium acetate, respectively. The acetic acid ratio is defined as the (molar) ratio of acetic acid relative to sodium acetate plus acetic acid. In FIG. 1, a is indicative of an acetic acid ratio range in which there is no weight reduction relative to LDH3, and b is indicative of an acetic acid ratio range in which there is no weight reduction relative to LDH2.

In FIG. 2, a is indicative of the value of pH with respect to the upper limit to the acetic acid ratio in which there is no weight reduction relative to LDH3 in FIG. 1, and b is indicative of the value of pH with respect to the upper limit to the acetic acid ratio in which there is no weight reduction relative to LDH2.

BEST MODE FOR CARRYING OUT THE INVENTION

Figure 1:
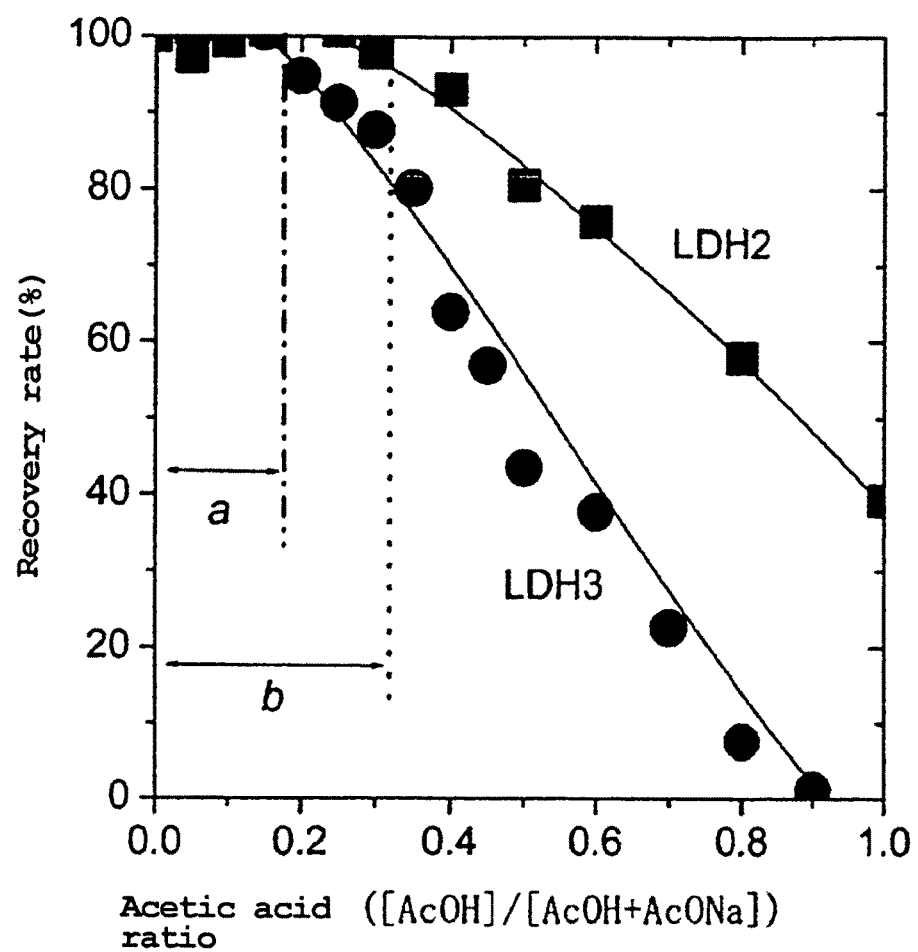
FIG. 1 is a graph illustrative of weight changes in Example 1. One hundred (100) % recovery rate indicates that there is no weight reduction.

In the chemical formula for the LDH that is the starting material, the carbonate ion ($CO_3^{2-}$) content of the starting material is set at 0.5 at most. This is representative of a composition containing most carbonate ions and so most difficult to achieve decarbonation. As a matter of course, in a raw material having a part of carbonate ions substituted by other anions and so containing smaller amounts of carbonate ions, de-carbonation takes place readily via the method of the invention; in other words, there is no particular reason for specifying actual examples containing smaller amounts than that.

The starting material LDH here has the chemical formula: $Q_xR(OH)_z(CO_3^{2-})_{0.5-y/2}(X^-)_y \cdot nH_2O$ where x is indicative of a numeral range of $1.8 \leq x \leq 4.2$; z is indicative of $2(x+1)$; y is indicative of a minimum value of at least 0 that increases to less than 1 when anions ($X^-$) remain or a part of anions is introduced; Q is a divalent metal ion; R is a trivalent metal ion; and n is substantially 2 although varying depending on an environmental humidity. The chemical formula where y takes a maximum of 1, meaning perfect substitution by anions ($X^-$), is representative of a composition where the most perfect ion exchange takes place. As a matter of course, slacking off experimental conditions results in a compound where carbonate ions remain with partial substitution by anions ($X^-$). Compounds for which perfect substitution is practically not demanded are included in the scope of what is claimed is, too. In the operation steps of separation, filtration, and drying of the product, $CO_2$ is often entrapped in it from the air or the atmosphere, resulting in secondary entrapment of slight amounts or about a few % of carbonate ions, and there is practically no need of reducing the amount of substitution down to just 0. Therefore, the instant invention is not strictly limited to the formula: $Q_xR(OH)_z(X^-)\cdot nH_2O$.

The present inventors have figured out the aforesaid means for attaining the object of the invention, thereby successfully converting the starting carbonate type LDH into an LDH containing the added anions through de-carbonation that occurs in a very short period of time without giving rise to the dissolution of the starting material.

Based on the aforesaid idea, the present inventors have singled out a buffer and made intensive studies of its decarbonation effect. Consequently, the present inventors have found out the best embodiment wherein an "acetic acid buffer" comprising acetic acid as the acid and sodium acetate as its conjugate base is used. Then, a chlorine ion-containing base (e.g., NaCl) is added to, and allowed to act on, that system at room temperature so that while crystal shape, crystal structure and crystallinity are kept intact, decarbonation occurs in a very short period of time with no entrapment of acetate ions from the buffer, ending up with conversion into an LDH containing the added anions alone.

The present inventors have also found out that the use of the acetic acid buffer/NaCl mixed solution proffers a lot of advantages inclusive of: 1) the solution has a weakly acidic pH of about 5.0 to 5.5, 2) pH changes upon the reaction are reduced down to about 0.5, and 3) the necessary NaCl concentration is sufficiently reduced down to about ⅕ times as much as needed in the hydrochloric acid/NaCl method.

Thus, the present inventors have successfully used a mixed solution comprising an acetic acid buffer and a chlorine ion-containing salt to allow a difficult-to-ion exchange carbonate ion type LDH to be decarbonated at room temperature yet in a short period of time without affecting grain diameter and homogeneity, thereby converting it into an easy-to-anion exchange carbonate ion type LDH.

In the invention, the acetic acid buffer is used for the reason that acetate ions ($CH_3COO^-$) are hardly entrapped in the LDH, and the requirement for the acetic acid buffer here is that it contain acetate ions. In principle, given salts of acetate ions and an equivalent pH range, an ion pair does not exclude buffers containing analogous acetate ions including cations such as potassium ($K^+$), lithium ($Li^+$), ammonium ($NF_4^+$) or timethylamine ($(CH_3)_3N^+$). Now that sodium ions ($Na^+$) are most often used as the cations, the most general acetic acid buffer is described as a specific example.

As can be noted from the example using the acetic acid buffer, the pH of the aqueous solution is set and kept at greater than 4 but less than 7 so that any pH (hydrogen ion exponent) change with the progress of the decarbonation reaction is held back. For the buffer that provides an aqueous solution having a pH (hydrogen ion exponent) kept at greater than 4 but less than 7, any desired one may be used unless anions present therein are entrapped in the LDH. Such buffers, because of comprising a weak acid and its conjugate base, exist in numerous combinations, as described in general handbooks or manuals of chemistry.

For instance, there is the mention of a phosphate base buffer (composed mainly of phosphoric acid and its conjugate base), a citrate base buffer (composed mainly of citric acid and its conjugate base), a borate base buffer (composed mainly of boric acid and its conjugate base), a tartrate base buffer (composed mainly of tartaric acid and its conjugate base), a succinate base buffer (composed mainly of succinic acid and its conjugate base), and buffers composed of other weak acids and their conjugate bases as well as combinations of them.

Acetic acid turns into sodium acetate through the decarbonation reaction, as will be described later; however, the object of the invention may be attained to some extents even by a method wherein only acetic acid is added dropwise to a NaCl solution containing the carbonate type LDH while the pH of the aqueous solution is kept at greater than 4 but less than 7. And there is buffering action obtained due to the creation of sodium acetate. Although the buffer agent is not used from the start, this method, too, might be stemmed from the concept of using buffers.

It follows that similar phenomena would be found even with phosphoric acid, citric acid, boric acid, tartaric acid or other acids, too.

Exemplified in Examples 1 to 7 given below are (MgAl-LDHs) represented by the general formula: $Q_xR(OH)_z(CO_3^{2-})_{0.5-y/2}(X^-)_y \cdot nH_2O$ where Q is Mg and R is Al. Q and R to be substituted in the LDHs as in Examples 1 to 7 include:

the divalent metal ion Q selected from the group consisting of Mn, Fe, Co, Ni, Cu, Zn, and Ca, and the trivalent metal ion R selected from the group consisting of Ga, Cr, Mn, Fe, Co, Ni, and La.

In Examples 8 and 9, other LDHs (Q: Ni, Zn, R:Al) are exemplified.

Note here that when there is the simple mention of LDH, it stands for MgAl-LDH, but when there are other metal ions contained, the LDH is designated typically as ZnAl-LDH with the metal name attached to it, and that with LDHs composed of Mg and Al, too, they are designated as MgAl-LDH especially when there is the need of referring specifically to the metal ion.

The means for attaining the object of the instant invention as described above is now explained more specifically with reference to examples. However, they will be given as an aid of enabling those skilled in the art to have a better understanding of the instant invention, and will not be restrictive. To indicate that there is the need of using a mixed solution of NaCl and the acetic acid buffer in the preparation method of the invention, a comparative experiment using the acetic acid buffer alone is also given in Example 1.

EXAMPLE 1

The following LDHs were used in Examples 1 to 7. LDHs containing Mg ions as the divalent metal ions and Al ions as the trivalent metal ions were used, one having an Mg/Al ratio of about 3 termed as LDH3, and one having an Mg/Al ratio of about 2 as LDH2. LDH3 was a commercial hydrotalcite product represented by formula: $Mg_3Al(OH)_8(CO_3^{2-})_{0.5} \cdot 2H_2O$ (DHT-6 made by Kyowa Chemical Industry Co., Ltd. with an average grain diameter of about 0.5 to 1 μm and an Mg/Al molar ratio of 2.97 (+0.02). LDH2 was synthesized pursuant to Non-Patent Publication 6, with an average grain diameter of about 1 to 2 μm and an Mg/Al molar ratio of 1.93 (+0.01).

Experimentation was carried out for the purpose of looking at the effect of the acetic acid buffer alone on the LDH and clarifying the relation between the pH of the solution and LDH's weight reductions.

LDH3 was used in 20.0 mg and LDH2 in 16.1 mg. This was to make the quantities of anions in both LDHs equal, 0.066 mmol in term of mole. Added under mild shaking to each at 25° C. for 1 day was 10 ml of an aqueous solution of a 0.1 mol/L acetic acid buffer at a varied (acetic acid)/(acetic acid+ sodium acetate) ratio (hereinafter referred simply to as the acetic acid ratio) for reaction. Then, the reaction product was filtered through a 0.2 μm membrane filter in a nitrogen stream, and the precipitate was fully washed with ion exchanged water that had been boiled for removal of carbon dioxide. The filtered-out precipitate was gathered up and recovered, immediately depressurized and dried under a vacuum for 1 hour or longer to obtain white powders.

By Fourier transform IR spectrometry and gravimetric analysis, the degree of decarbonation and weight changes (recovery rate) were examined (FIG. 1). The recovery rate was corrected while weight losses due to operations such as filtration were factored out, with a 100% recovery rate meaning that there was neither weight reduction nor LDH dissolution. From FIG. 1, it has been found that with LDH2, there is no weight reduction in the acetic acid ratio range of 0 to 0.33 (a in FIG. 1) and there is a weight reduction at an acetic acid ratio exceeding 0.33, and with LDH3, there is no weight reduction in the acetic acid ratio range of 0 to 0.18 (b in FIG. 1), and there is a weight reduction at an acetic acid ratio exceeding 0.18; weight decreases and the recovery rate goes down with increasing acetic acid ratios. Even of the LDHs treated at any acetic acid ratios, Fourier transform IR spectra have shown that there is no change in absorption due to C—O stretching vibration ($\upsilon_{C-O}$) of a carbonate ion found near 1368 $cm^{-1}$, and powder X-ray diffraction has shown that the basal spacing is the same as that of the starting carbonate ion type layered double hydroxide, with no or little reduction in carbonate ions.

Figure 2:
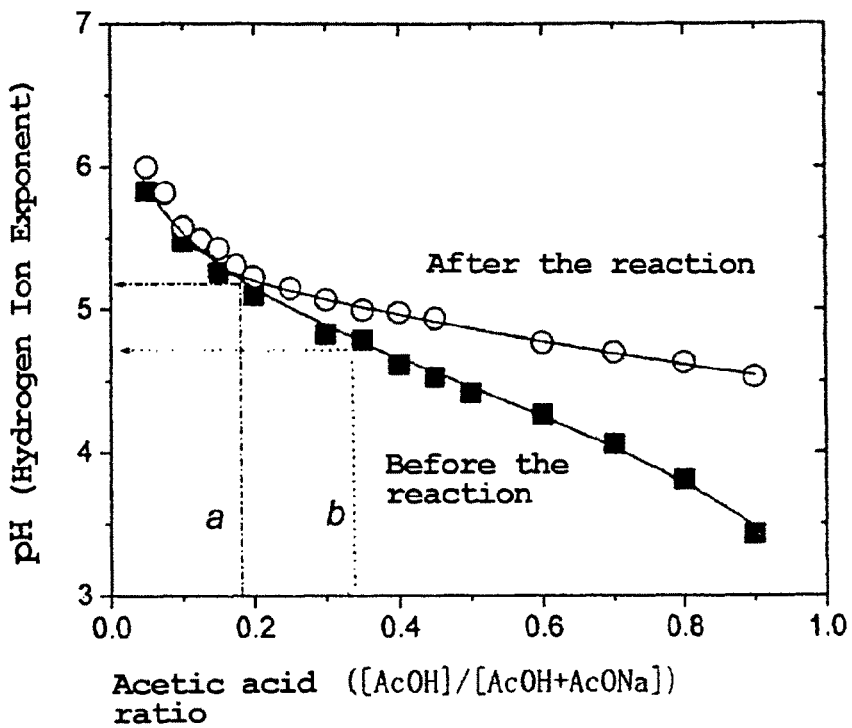
FIG. 2 is a graph illustrative of the pH of the solution before and after the reaction in Example 1.

The pH of the solution before the reaction, and the pH of the solution after the reaction in the experimentation with LDH3 added to it were plotted in FIG. 2. The pH difference became noticeable at an acetic acid ratio of 0.18 or greater. For LDH3, this has relations to weight reductions occurring at greater than 0.18. From this, it has been found that LDH3 does not dissolve in a buffer having a pH of greater than 5.2 (a in FIG. 2 corresponding to a in FIG. 1). LDH2 containing more Al component is a bit more resistant to acids than LDH3, and starts to decrease in weight at an acetic acid ratio of greater than 0.33 in FIG. 1; the value of the pH (before the reaction) of the buffer in FIG. 2 corresponding to this is 4.6 to 4.7 (b in FIG. 2). This teaches that LDH2 does not dissolve in a buffer having a pH value of 4.6 to 4.7 or greater. It has thus been found that no weight reduction (LDH dissolution) occurs under acidic conditions in general, and under weakly acidic conditions at a pH of greater than 4 but less than 7 in particular, so buffers having such a pH range are well suited.

EXAMPLE 2

This experimentation was carried out while the concentration of NaCl in an acetic acid buffer/NaCl mixed solution was varied to examine changes in the quantity of carbonate ions in the LDH, and weight reductions of the LDH, when NaCl was added to it.

Sixteen point one (16.1) mg of LDH2, to which 10 ml of an acetic acid buffer/NaCl mixed solution comprising a 0.1 mol/L of an acetic acid buffer having an acetic acid ratio of 0.1 were added to vary the NaCl concentration between 0 and 25% by weight, were subjected to reaction under mild shaking at 25° C. for 1 day. Then, the reaction product was filtered through a 0.2 μm membrane filter in a nitrogen stream, and the precipitate was fully washed with ion exchanged water that had been boiled for removal of carbon dioxide. The filtered-out precipitate was gathered up and recovered, immediately depressurized and dried under a vacuum for 1 hour or longer to obtain white powders. LDH3 was used in 20.0 mg.

Figure 3:
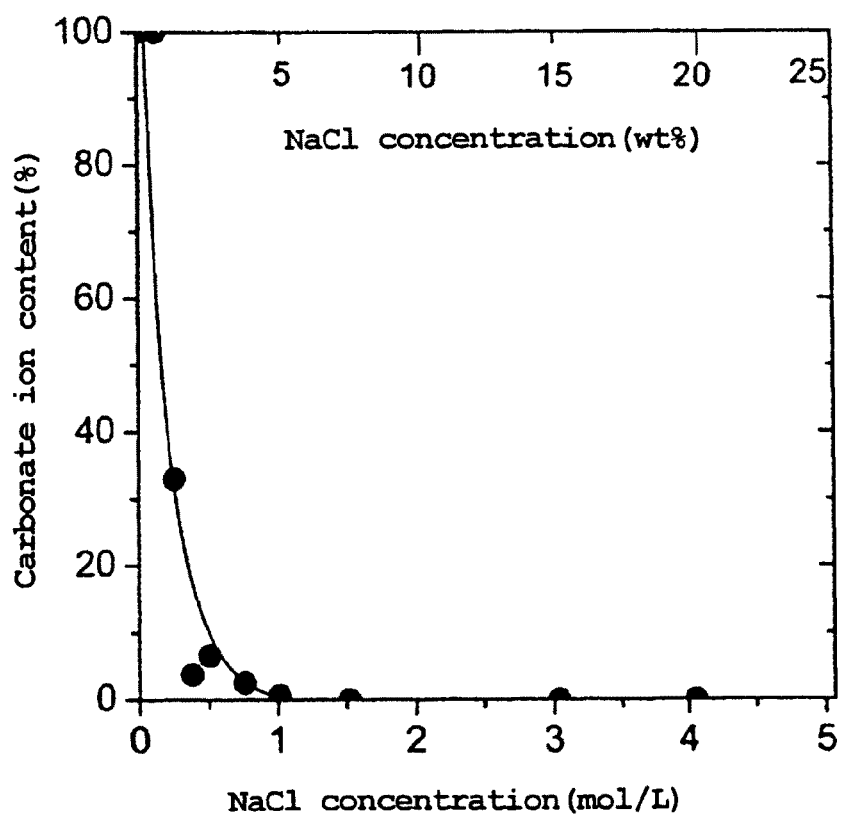
FIG. 3 is a graph illustrative of changes in the residual carbonate ion content of LDH2 under the action of solutions having varied NaCl concentrations on the acetic acid buffer (0.1 mol/L) in Example 2.
Figure 4:
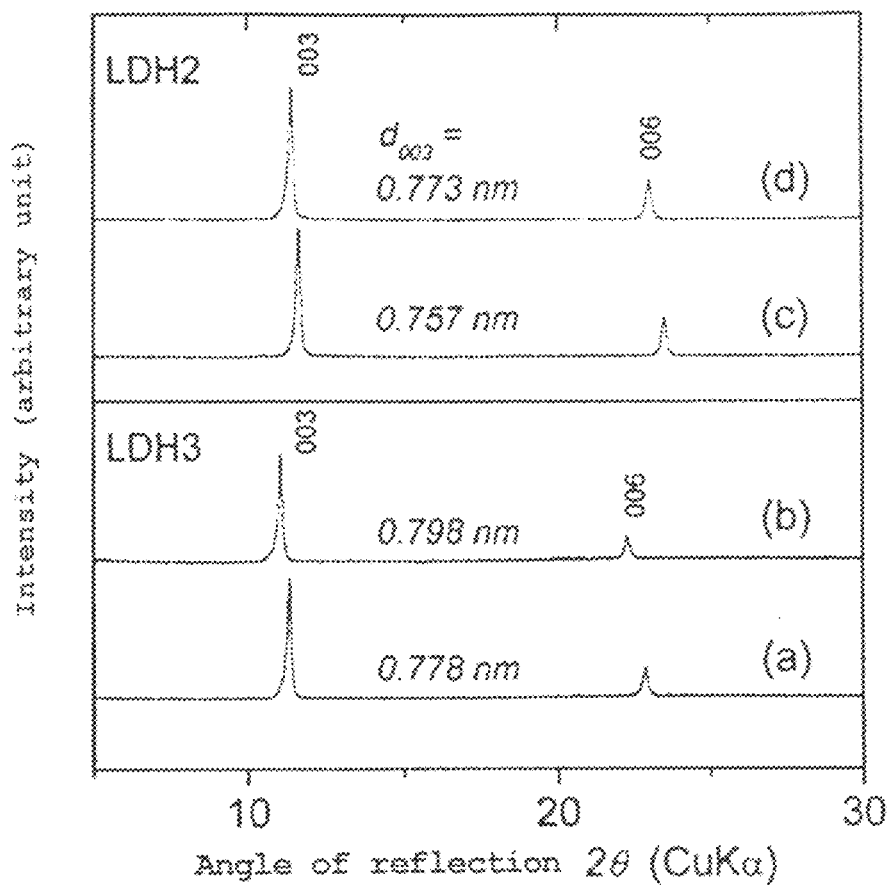
FIG. 4 is the powder X-ray diffraction profiles of decarbonated samples in Example 2: (a) the starting carbonate type LDH3, (b) LDH3 (of the Cl⁻ type) after decabonation, (c) the starting carbonate type LDH2, and (d) LDH2 (of the Cl⁻ type) after decarbonation. In the Cl⁻ LDH profile after decarbonation, there is no starting material's residual peak observed at all.

The samples were analyzed by Fourier transform IR spectrometry and gravimetric analysis for the degree of decarbonation and weight changes. The carbonate ion content was determined from the results of Fourier transform IR spectrometry. FIG. 3 shows changes in the carbonate ion content of LDH2 due to NaCl concentration changes. Consequently, it has been found that carbonate ions disappear almost completely from LDH2 at an NaCl concentration of greater than 5% by weight (1 mol/L), and residual carbonate ions are less than barely 5% even at 2% by weight. From the basal spacing (that was 0.798 nm for LDH3 and 0.773 nm for LDH2 after the decarbonation reaction; corresponding to (b) and (d) in FIG. 4) figured out from powder X-ray diffraction (FIG. 4) and FTIR profiles, it has been found that the obtained LDHs are Cl$^-$ LDHs, and from diffraction peak shapes it has been found that there is no or little crystallinity change: Cl$^-$ LDHs of good quality are synthesized. By chemical analysis, the Cl content was 11% by weight for LDH3 and 14% by weight for LDH2, in good agreement with the theoretical values of 11.5% by weight and 14.2% by weight for LDH3 and LDH2, respectively.

Figure 5:
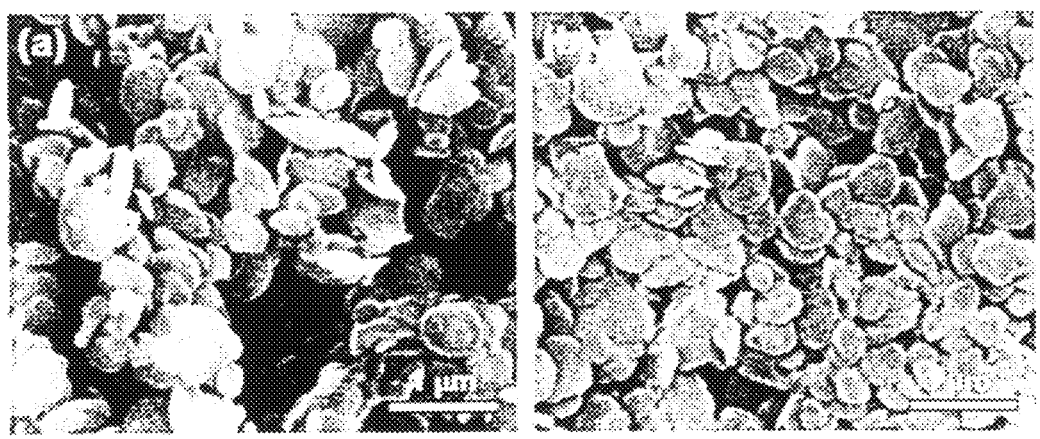
FIG. 5 is the photographs taken through a SEM (scanning electron microscope) of images of decarbonated LDH3 samples in Example 2: (a) the starting carbonate type LDH3 and (b) LDH3 (of the Cl⁻ type) after decarbonation. There is no change either in crystal shape or in crystal grain diameter. Both photographs were taken at the same magnification with a bar of 1 μm.
Figure 6:
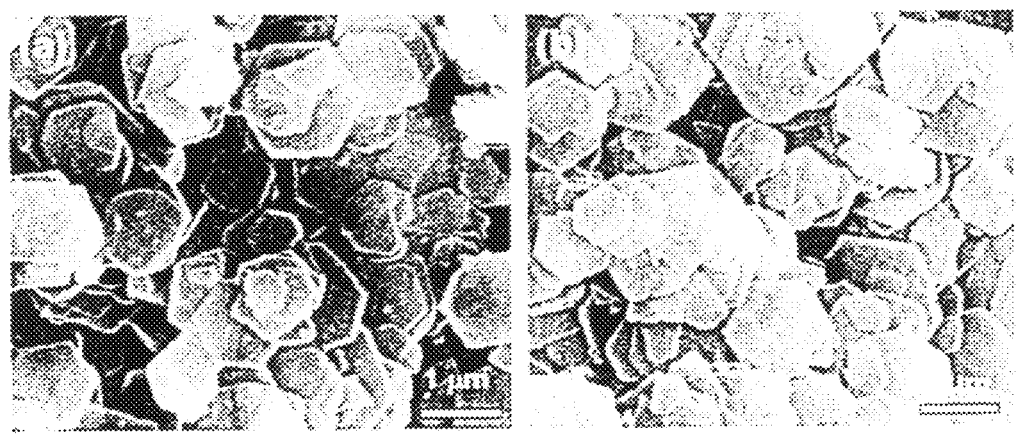
FIG. 6 is the photographs taken through a SEM (scanning electron microscope) of images of decarbonated LDH2 samples in Example 2: (a) the starting carbonate type LDH3 and (b) LDH3 (of the Cl⁻ type) after decarbonation. There is no change either in crystal shape or in crystal grain diameter. Both photographs were taken at the same magnification with a bar of 1 μm.

Referring to weight reductions, nearly 100% were recovered although not shown: there was no weight reduction (with losses due to operations such as filtration factored in). With LDH3 too, the same results as in LDH2 were obtained in terms of changes in the carbonate ion content and weight reductions. The SEM photographs attached hereto as FIGS. 5 and 6 show (a) the shape of the starting carbonate type LDH and (b) the shape of Cl$^-$ LDHs obtained through the decarbonation reaction. As can also be seen from these photographs, in both LDH3 and LDH2, the crystal shapes and grain diameters of the obtained Cl$^-$ LDHs were equivalent to those of the starting carbonate type LDH. From these, it has been demonstrated that the crystal shapes, crystal structures and crystallinity of the synthesized LDHs are similar to those of the starting carbonate type LDH.

EXAMPLE 3

LDH2 and LDH3 were each analyzed for carbonate ion changes and weight reductions, and determined about the optimum acetic acid ratio in the case where there were varied acetic acid ratios of the acetic acid buffer in the acetic acid buffer/NaCl mixed solution. LDH3 was used in 20.0 mg, and LDH2 in 16.1 mg. Added to each were 10 mL of an acetic acid buffer/NaCl solution in which while the acetic acid buffer concentration was fixed at 0.1 mol/L and the NaCl concentration at 2.53 mol/L, the acetic acid ratio was varied from 0 up to 0.6 for reaction at 25° C. After the elapse of one day, the reaction product was filtered through a 0.2 μm membrane filter in a nitrogen stream, and the precipitate was fully washed with ion exchanged water that had been boiled for removal of carbon dioxide. The filtered-out precipitate was gathered up and collected, and immediately depressurized and dried under a vacuum for 1 hour or longer, thereby obtaining white powders.

Figure 7:
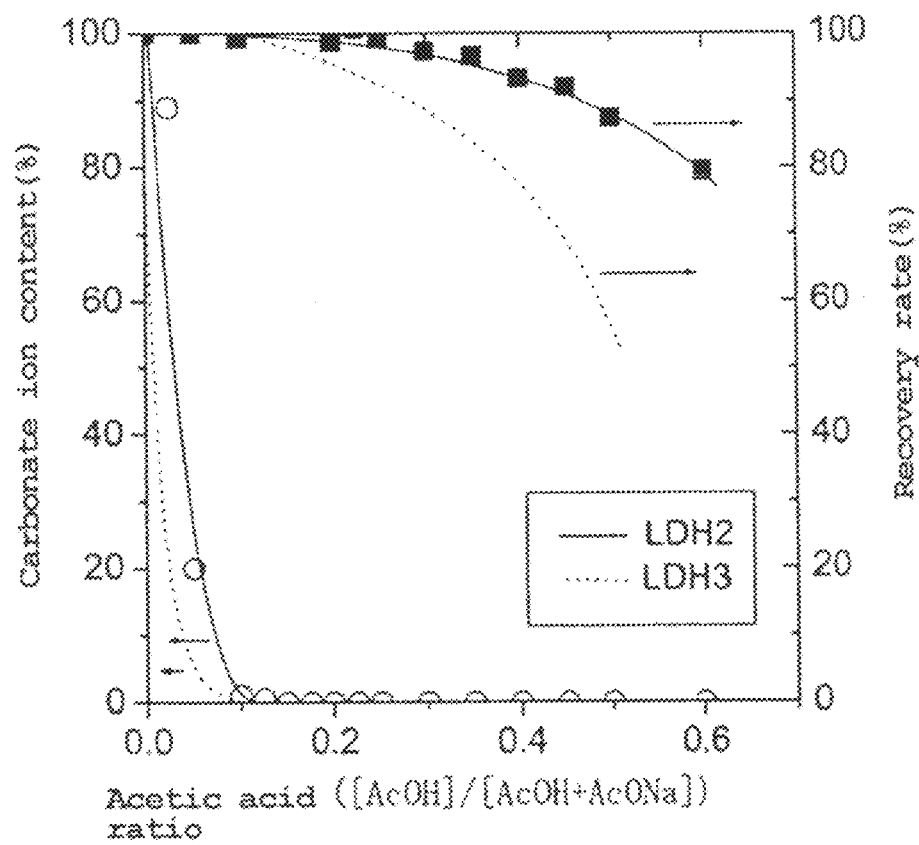
FIG. 7 is a graph illustrative of changes in the residual carbonate ion content, and weight (recovery rate) of LDH2 at varied acetic acid ratios in Example 3.
Figure 8:
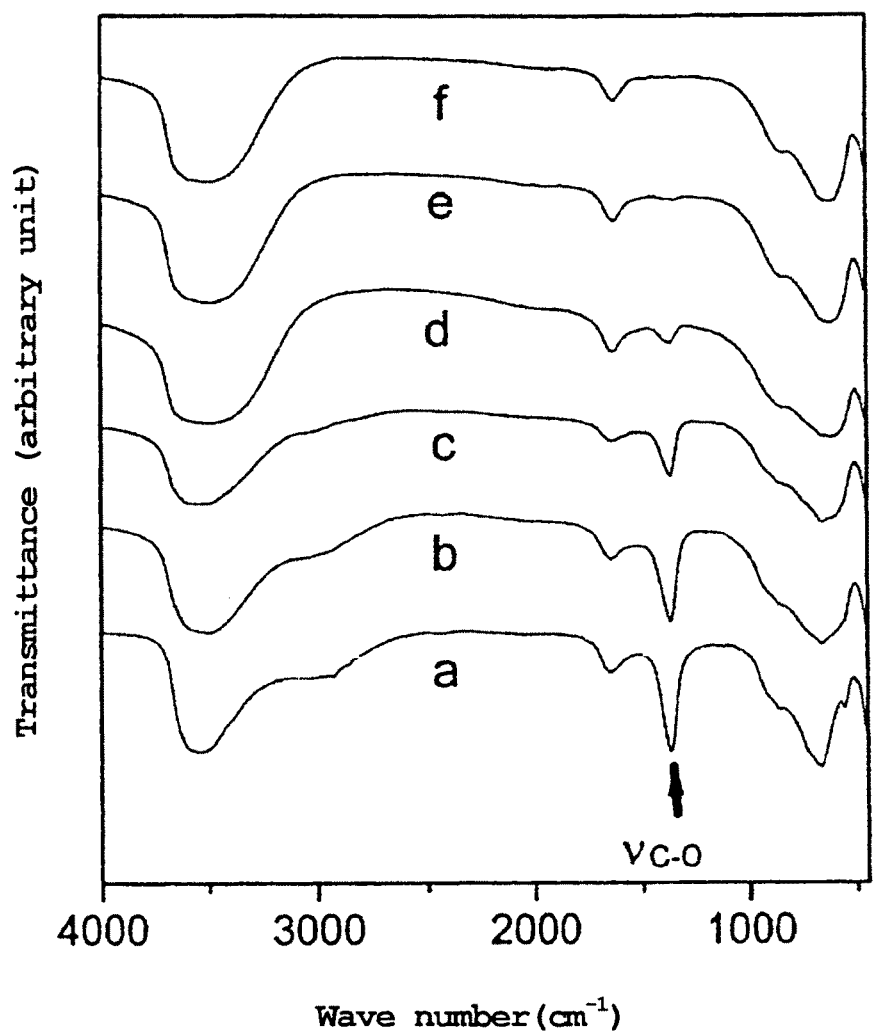
FIG. 8 is illustrative of the Fourier transform IR spectra of LDH3 in Example 3: (a) IR absorption profiles of LDH3 before the reaction, and (b), (c), (d), (e) and (f) IR absorption profiles of LDH3 under the action of an acetic acid buffer/NaCl solution having varied acetic acid ratios of 0.010, 0.025, 0.050, 0.100 and 0.250, respectively.

For each of LDH2 and LDH3, the quantity and weight of carbonate ions are plotted with respect to the acetic acid ratio in FIG. 7. For simplified representation, measurement points are given only for LDH2. Carbonate ions disappear from both LDH2 and LDH3 at an acetic acid ratio of 0.07 to 0.1 or greater. On the other hand, weight reductions start at greater than 0.2 for LDH2, and at greater than 0.15 for LDH3. From this, it has been found that when the acetic acid ratio is in the range of about 0.07 to 0.2, decarbonation can occur with no weight reductions. The FTIR (Fourier transform IR spectrometry) profiles of LDH3 corresponding to that change are presented in FIG. 8. Spectrum a is the profile of the starting carbonate type LDH3, found near 1368 cm$^{-1}$ derived from carbonate ion C-O stretching vibration ($v_{C-O}$). Spectra are lined up such that the acetic acid ratio increases from b to f; however, with increasing acetic acid ratios, this absorption strength decreases, and there is no absorption at an acetic acid ratio of greater than 0.10 (spectrum e), indicating that carbonate ions have disappeared from between layers.

Figure 9:
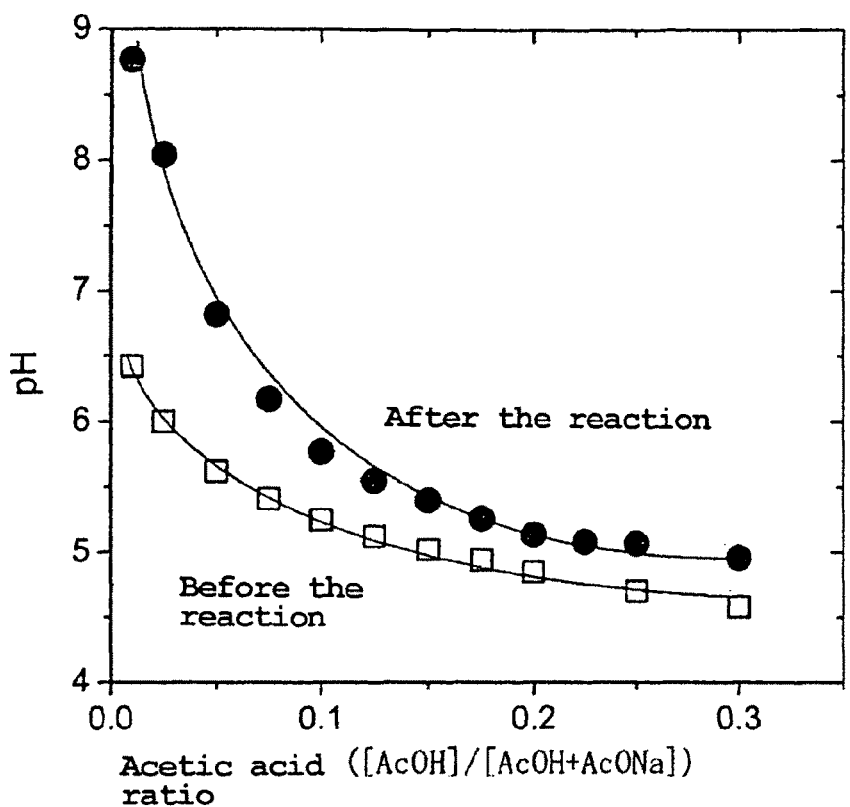
FIG. 9 is a graph illustrative of pH changes of LDH3 before and after the reaction in Example 3.

For LDH3, pH changes upon experimentation are shown in FIG. 9. Before and after the decarbonation reaction, there was a pH increase of about 0.5 observed. At an acetic acid ratio of less than 0.07, some considerable pH rises were observed. This is because Cl ions are entrapped in between the layers so that sodium carbonate occurs in the solution. At greater than the buffer capacity, the pH increases remarkably.

EXAMPLE 4

LDH2 and LDH3 were each analyzed for carbonate ion changes and weight reductions in an acetic acid buffer/NaCl mixed solution, and determined about the optimum acetic acid buffer concentration in the case where the concentration of the acetic acid buffer was varied. LDH3 was used in 20.0 mg, and LDH2 in 16.1 mg. Added to each were 10 mL of an acetic acid buffer/NaCl solution in which while the acetic acid ratio was fixed at 0.10 (LDH3) and 0.15 (LDH2) and the NaCl concentration at 2.53 mol/L, the acetic acid buffer concentration was varied from 0 up to 0.25 mol/L for reaction at 25° C. After the elapse of one day, the reaction product was filtered through a 0.2 μm membrane filter in a nitrogen stream, and the precipitate was fully washed with ion exchanged water that had been boiled for removal of carbon dioxide. The filtered-out precipitate was gathered up and collected, and immediately depressurized and dried under a vacuum for 1 hour or longer, thereby obtaining white powders.

Figure 10:
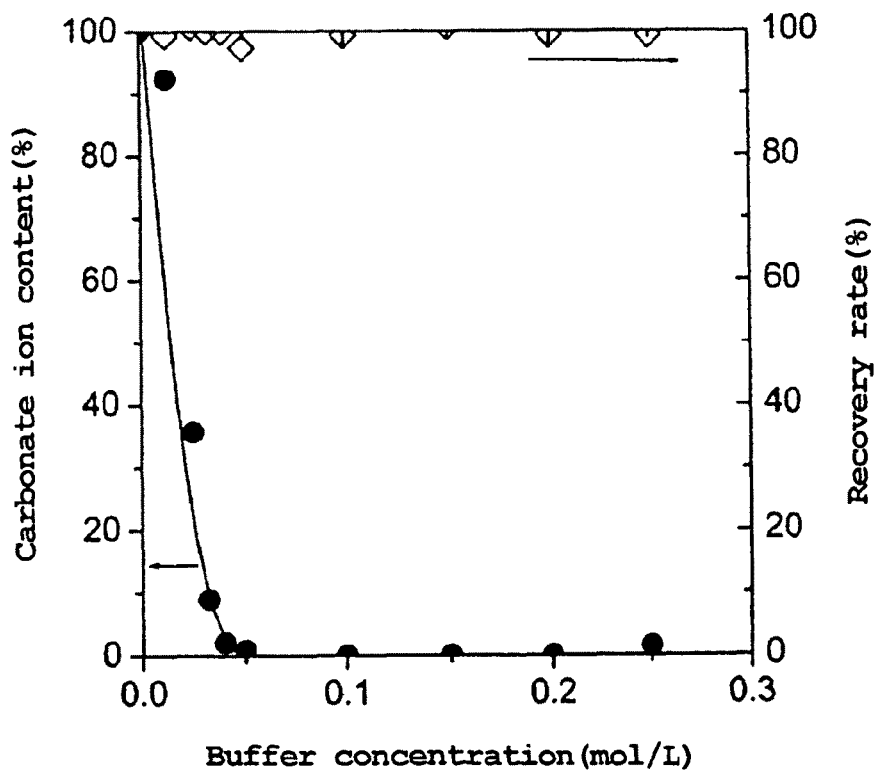
FIG. 10 is a graph illustrative of changes in the residual carbonate ion content and weight (recovery rate) of LDH2 at varied buffer concentrations in Example 4.

For LDH2, the quantity and weight of carbonate ions are plotted with respect to the acetic acid buffer concentration in FIG. 10. At an acetic acid buffer concentration of greater than 0.02 mol/L, the quantity of carbonate ions decreases remarkably, and at greater than 0.04 mol/L the quantity of carbonate ions becomes nearly zero. Referring here to the recovery rate, there was no weight reduction found even at 0.25 mol/L that was the upper limit to the experimental range. With LDH3 too, similar results were obtained. Another experiment was carried out at 0.5 mol/L; however, there was an about 3% weight reduction observed under this condition. That is, it has been shown that remarkable decarbonation can occur at a buffer concentration of greater than 0.02 mol/L, and there is no weight reduction problem due to dissolution at a buffer concentration of up to 0.25 mol/L.

EXAMPLE 5

For the examination of reaction times, a period of time from the addition of a acetic acid buffer/NaCl mixed solution until filtration was varied to look at the degree of progress of decarbonation by IR spectrometry. Added to the LDH were 10 mL of a acetic acid buffer/NaCl mixed solution having an acetic acid ratio fixed at 0.1, an acetic acid buffer concentration fixed at 0.1 and an NaCl concentration fixed at 2.53 mol/L for reaction at 25° C. LDH3 was used in 20.0 mg, and LDH2 in 16.1 mg. After the elapse of one day, the reaction product was filtered through a 0.2 μm membrane filter in a nitrogen stream, and the precipitate was fully washed with ion exchanged water that had been boiled for removal of carbon dioxide. The filtered-out precipitate was gathered up and collected, and immediately depressurized and dried under a vacuum for 1 hour or longer, thereby obtaining white powders.

Figure 11:
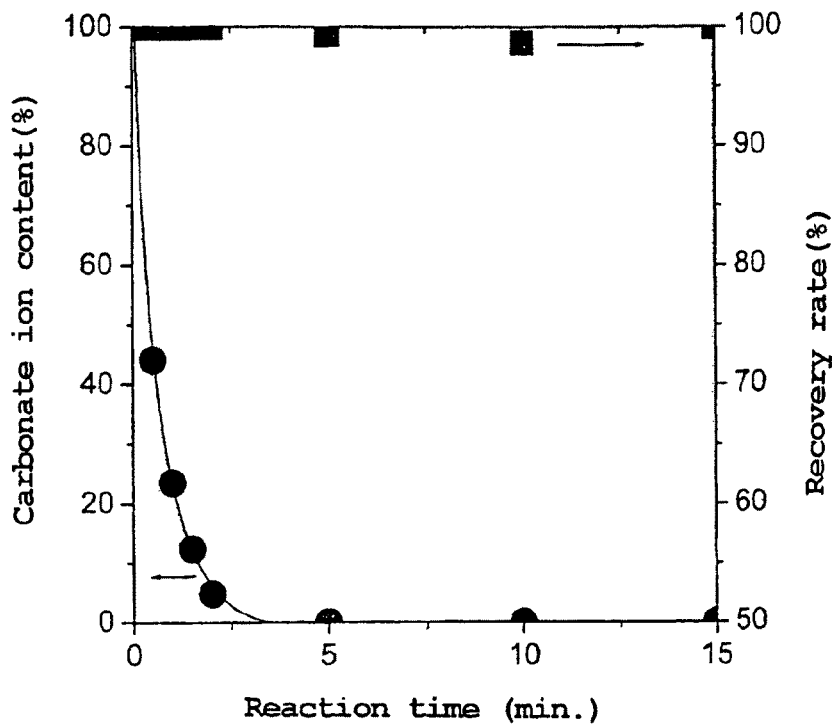
FIG. 11 is a graph illustrative of changes-with-time in the residual carbonate ion content and weight (recovery rate) of LDH2 in Example 5.

For LDH2, changes with time of the quantity of carbonate ions are shown in FIG. 11. With LDH2, carbonate ions vanished off almost perfectly in about 3 minutes, indicating that the reaction time is extremely short. Although not illustrated, it has been found that LDH3 takes 30 seconds from addition until filtration, and almost perfect decarbonation is achievable even by the shortest 30-second reaction. It has also been found that even when the reaction time is extended to 7 days, there is no or little weight reduction, and even when the reaction product is let stand alone for an extended period of time in a weakly acidic solution, there is none of dissolution or other problems.

It has consequently been found that if a chloride salt (e.g., NaCl) is added to an acetic acid buffer devoid of decarbonation action whatsoever and that acetic acid buffer/NaCl mixed solution is added to, and allowed to act on, an LDH at room temperature, then the LDH is decarbonated within a very short time without dissolution. There was concern that acetate ions were incorporated in the LDH occurring from decarbonation because acetate ions were present in the reaction system; however, as described in Example 2, it has been found from the basal spacing of the product by X-ray diffraction (FIG. 4), the profiles of Fourier transform IR spectroscopy (FIG. 8) and compositional analysis that the LDH occurring from decarbonation is an LDH containing anions of the added salt (chlorine ions in the example). This could be because the selectivity of the LDH relative to acetate ions is much lower than to anions such as $Cl^-$; so acetate ions are hardly incorporated between layers.

It has already emerged that LDHs equivalent to the LDH obtained by the instant method with anions contained in it are further converted by simple, ordinary ion exchange into LDHs containing other anions while their shape, grain diameter and weight are kept intact (Non-Patent Publications 6, 15 and 16).

For effective implementation of decarbonation, there is the need of finally determining the condition for it via experimentation. However, it may be possible to roughly figure out that condition from the decarbonation mechanism and the results of the examples. Set out below is why and how the condition for effective decarbonation is roughly figured out. The LDH sample used here is in 0.066 mmol. As an acetic acid buffer/NaCl mixed solution is allowed to act on the LDH, it permits carbonate ions (0.033 mmol) to be released off and only Cl ions to be entrapped between layers from the NaCl solution. Sodium carbonate reacts with acetic acid in the acetic acid buffer, turning into sodium acetate (0.066 mmol). This is the buffering mechanism. When the amount of acetic acid is larger than the amount at which it is neutralized with sodium carbonate, there is buffering action. In other words, the lower limit to the acetic acid ratio and concentration of the acetic acid buffer may be determined in such a way that acetic acid is needed in an amount greater than the amount of sodium in the ensuing sodium carbonate. When it comes to the LDH sample used in 0.066 mmol, (1) the (lower) acetic acid ratio of the acetic acid buffer must be 0.066 or greater because acetic acid must be present in greater than 0.066 mmol, although acetic acid and sodium acetate are each contained in an amount of 1.0 mmol in 10 mL of 0.1 mol/L acetic acid buffer, and (2) the (lower) concentration of the acetic acid buffer must be 0.66 mmol/10 mL, i.e., 0.066 mol/L or greater at an acetic acid ratio of 0.1, and 0.044 mol/L or greater at an acetic acid ratio of 0.15. These are almost in agreement with experimentally obtained values.

The upper limits to the acetic acid ratio and concentration of the acetic acid buffer are determined from pH values less likely to be affected by weight reductions, because they are limited by the dissolution of LDHs in acids. As referred to in Example 1, LDH3 is unsusceptible of dissolution at a buffer's pH of 5.2 or greater, and LDH2 is unsusceptible of dissolution at a buffer's pH ranging from 4.6 to 4.7 or greater; acidic conditions in general and weakly acidic conditions of greater than 4 to less than 7 in particular would be a buffer's pH range with no dissolution of LDHs. The acetic acid ratio of the acetic acid buffer is 0.33 or less correspondingly. There is no upper limit to the concentration of the acetic acid buffer, because there is in principle no pH change due to the concentration of the buffer solution, only with increasing buffer capacity. From Example 4, therefore, 0.02 mol/L at which some remarkable decarbonation occurs or greater would be reasonable for the concentration of the buffer solution.

Besides, the concentration of NaCl is preferably 1 mol/L or greater, because remarkable decarbonation occurs at 0.2 mol/L or greater (FIG. 3), and the upper limit to it is the saturation concentration of NaCl. The saturation concentration of NaCl in water at room temperature is nearly 25% by weight (5.06 mol/L) that roughly defines that upper limit. The reaction time is preferably 3 minutes or longer because with LDH2 taking much time for decarbonation, the time needed for completion of decarbonation is 3 minutes.

EXAMPLE 6

With reference to Examples 1 to 5, reference has been made to the effect of decarbonation in the case where the acetic acid buffer/NaCl was allowed to act on the layered double hydroxide wherein Mg and Al were used for Q and R in the general formula: $Q_xR(OH)_2(CO_3^{2-})_{0.5-y/2}(X^-)_y \cdot nH_2O$, respectively. The instant Example 6 and the following Example 7 show that even with the use of anions ($X^-$) other than $Cl^-$, decarbonation occurs as is the case with the acetic acid buffer/NaCl, yielding LDHs containing said anions ($X^-$).

$ClO_4^-$ was chosen as the anions ($X^-$) other than $Cl^-$, $NaClO_4$ was used as a salt containing $ClO_4^-$, and the concentration of $NaClO_4$ in the acetic acid buffer/$NaClO_4$ mixed solution was varied to look at changes and weight reductions in the quantity of carbonate ions in the MgAl base LDH.

Ten (10) ml of an acetic acid buffer/NaClO$_4$ mixed solution having a NaClO$_4$ concentration adjusted to 0 to 8.2 mol/L and comprising a 0.1 mol/L acetic acid buffer having an acetic acid ratio of 0.126 were added to 20.0 mg of LDH3 for reaction under mild shaking at 25° C. for 1 day. Thereafter, filtration and drying were carried out as in Example 1 to obtain white powders.

Figure 12:
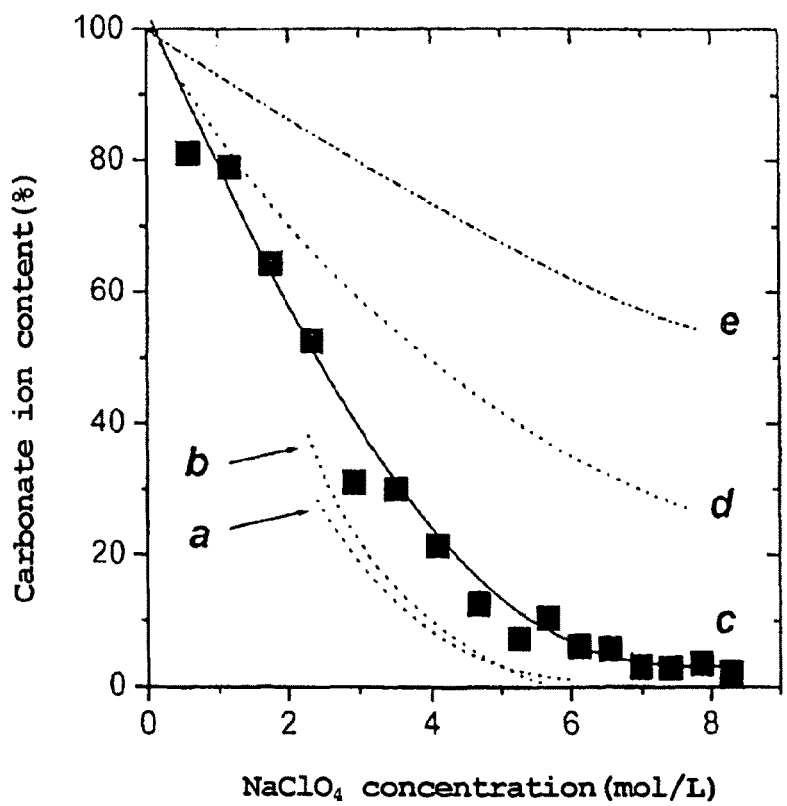
FIG. 12 is graphs illustrative of the residual carbon ion content of LDH3 under the action of an acetic acid buffer/NaClO₄ solution at varied NaClO₄ concentrations in Example 6 in the case of (a) the acetic acid buffer concentration is 0.10 mol/L with an acetic acid ratio of 0.150, (b) the acetic acid buffer concentration is 0.20 mol/L with an acetic acid ratio of 0.126, and (c) the acetic acid buffer concentration is 0.10 mol/L with an acetic acid ratio of 0.126 as well as, for the purpose of comparison, (d) and (e) under the action of solutions having varied NaClO₄ concentrations on 0.005N perchloric acid and 0.0025N per-chloric acid, respectively.

The degree of decarbonation and weight changes were determined by Fourier transform IR spectroscopy and gravimetric analysis. The content of carbonate ions was determined from the results of Fourier transform IR spectroscopy. Changes in the content of carbonate ions due to NaClO$_4$ concentration changes are shown at c in FIG. 12. As can be seen from FIG. 12, residual carbonate ions were very limited down to 5% or less at a NaClO$_4$ concentration of 7 mol/L or greater. Although not shown, weight reductions were corrected in terms of a molecular weight change due to the inclusion of ClO$_4^-$ ions; nearly 100% were recovered with no or little weight reductions (with losses due to filtration and other operations factored in). From SEM images too, the crystal shape and grain diameter of the ensuing ClO$_4^-$ LDH were equivalent to those of the starting carbonate type LDH. From these considerations, it has been found that the resulting crystal shape, crystal structure and crystallinity are similar to those of the starting carbonate type LDH. (1) Experimental result (1) at an acetic acid ratio of 0.150 (a in FIG. 12), and experiment result (2) at an acetic acid ratio of 0.126 and an acetic acid buffer's concentration of 0.2 mol/L twice as much (b in FIG. 12) are also shown. Under these conditions, residual carbonate ions vanished off substantially at a NaClO$_4$ concentration of 6 mol/L or greater. When the concentration of the acetic acid buffer was 0.2 mol/L twice as much, there were significant weight reductions found; it is actually not preferable to increase the concentration.

For the purpose of comparison, an experiment was carried out with such a strong acid/neutral salt mixed solution as referred to in Patent Publication 2. More specifically, experiments were conducted with a solution in which a strong acid: perchloric acid (HClO$_4$) was used instead of the acetic acid buffer and sodium perchlorate (NaClO$_4$) was added to perchloric acid (HClO$_4$) of 0.005N that was the upper acid concentration where there was no significant weight reduction observed and a solution in which NaClO$_4$ was added to HClO$_4$ having a half concentration of 0.0025N. These results are shown at d and e in FIG. 12. When NaClO$_4$ was at a concentration of 4 mol/L, considerable residual carbonate ions were observed: about 55% with 0.005N HClO$_4$ and about 70% with 0.0025N HClO$_4$. Although some decarbonation was observed, the degree of decarbonation was much inferior to that in the case of using the acetic acid buffer. From this, it has been found that the method using the acetic acid buffer could go far beyond using acetic acid instead of the strong acid that is the acid component in the strong acid/neutral salt solution as referred to in Patent Publication 2.

EXAMPLE 7

NO$_3^-$ (nitrate ions) was chosen as the anions (X$^-$) other than Cl$^-$, NaNO$_3$ was used as a salt containing NO$_3^-$, and the concentration of NaNO$_3$ in the acetic acid buffer/NaNO$_3$ mixed solution was varied to look at changes and weight reductions in the quantity of carbonate ions in the MgAl-LDH.

Ten (10) ml of an acetic acid buffer/NaNO$_3$ mixed solution having a NaNO$_3$ concentration adjusted to 0 to 7 mol/L and comprising a 0.1 mol/L acetic acid buffer having an acetic acid ratio of 0.126 and 1.150 were added to 20.0 mg of LDH3 for reaction under mild shaking at 25° C. for 1 day. Thereafter, filtration and drying were carried out as in Example 1 to obtain white powders.

Characteristic infrared absorptions of NO$_3^-$ and CO$_3^{2-}$ overlapped, and the contents of carbonate ions and nitrate ions could not be found from the results of Fourier transform IR spectroscopy; so they were determined from the contents of C and N obtained through the chemical analysis (CHN analysis) of the obtained product. It has consequently been found that residual CO$_3^{2-}$ decreases with increasing NO$_3^-$, and CO$_3^{2-}$ is substituted by NO$_3^-$ (FIG. 13).

Figure 13:
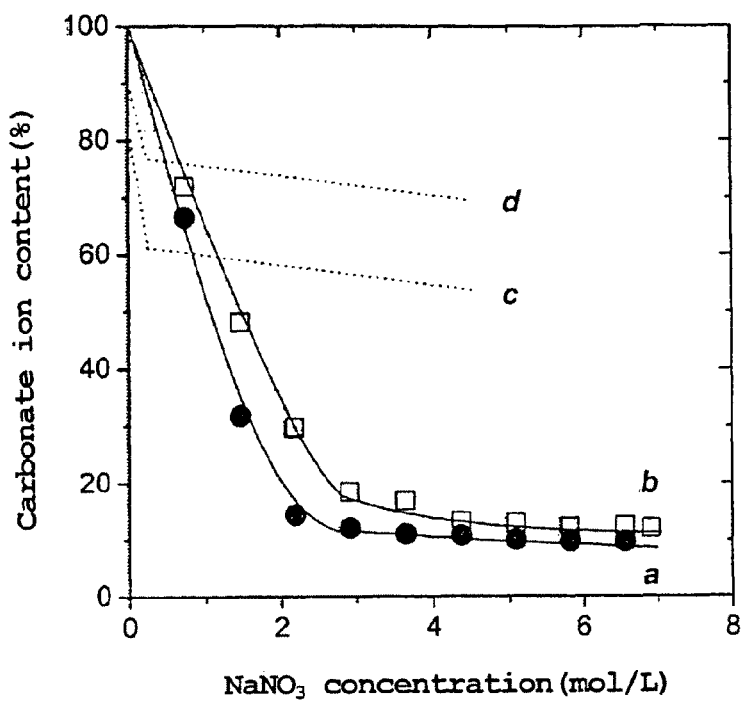
FIG. 13 is graphs illustrative of changes in the residual carbonate ion content of LDH3 under the action of acetic acid buffer (0.10 mol/L)/NaNO₃ solutions having varied NaNO₃ concentrations in Example 7 in the case of (a) the acetic acid buffer has an acetic acid ratio of 0.150 and (b) the acetic acid buffer has an acetic acid ratio of 0.126 as well as, for the purpose of comparison, (c) and (d) under the action of solutions having varied NaNO₃ concentrations on 0.005N nitric acid and 0.0025N nitric acid, respectively.

FIG. 13 shows that at a NaNO$_3$ concentration of 4 mol/L or greater, residual carbonate ions are 15% or less at the acetic acid ratio of 0.126 (b in FIG. 13), and 10% or less (a in FIG. 13) at the acetic acid ratio of 0.150. Even with the incorporation of carbonate ions due to filtration and other operations, the quantity of residual carbonate ions remains usually at 3 to 5% or less, figures somewhat smaller than those of FIG. 13. Although not shown, weight reductions were corrected in terms of a molecular weight change due to the inclusion of NO$_3^-$ ions; nearly 100% were recovered with no or little weight reductions (with losses due to filtration and other operations factored in).

For the purpose of comparison, an experiment was carried out with such a strong acid/neutral salt mixed solution as referred to in Patent Publication 2. More specifically, experiments were conducted with a solution in which a strong acid: nitric acid (HNO$_3$) was used instead of the acetic acid buffer and NaNO$_3$ was added to HNO$_3$ of 0.005N that is the upper acid concentration where there was no significant weight reduction observed and a solution in which NaNO$_3$ was added to HNO$_3$ having a half concentration of 0.0025N. These results are shown at c and d in FIG. 13. When NaNO$_3$ was at a concentration of 4 mol/L, considerable residual carbonate ions were observed: about 55% with 0.005N HNO$_3$ and about 70% with 0.0025N HNO$_3$. Although some decarbonation was observed, the degree of decarbonation was much inferior to that in the case of using the acetic acid buffer, indicating that the method using the acetic acid buffer outreaches the prior art.

EXAMPLE 8

The instant Example 8 and the following Example 9 show that similar decarbonation takes place even with combinations other than the one in which the metal ions Q and R in the general formula were Mg and Al ions, respectively. In Example 8, an experiment using an acetic acid buffer was carried out with a combination in which the metal ions Q and R were Ni and Al ions, respectively.

The starting material was synthesized according to the method described in Non-Patent Publication 6. More specifically, an aqueous solution containing 0.613 g of hexamethylenetetramine was added to an aqueous solution containing 0.727 g of nickel nitrate.hexahydrate and 0.469 g of aluminum nitrate.nonahydrate into a total of 25 ml of an aqueous solution, which was in turn heated at 140° C. for 1 day in a heat-resistant, pressure-resistant vessel, and then filterated and dried to obtain a light-blue, powdery product Ni$_2$Al(OH)$_6$(CO$_3^{2-}$)$_{0.5}$·nH$_2$O (hereinafter abbreviated as NiAl-LDH2) in 95% yields.

Ten (10) ml of each of acetic acid buffer/NaCl mixed solutions comprising a 0.1 mol/L acetic acid buffer having an acetic acid ratio of 0.150 and having a NaCl concentration adjusted to 0 to 4.5 mol/L were added to 20.69 mg of NiAl- LDH2 for reaction at 25° C. for 3 hours under mild shaking. Thereafter, the reaction product was filtrated and dried as in Example 1 to obtain light-blue powders.

From the results of Fourier transform IR spectroscopy, it has been found that samples obtained under NaCl concentration conditions of 2.5 mol/L or greater contain 5% or less of residual carbonate ions (b in FIG. 14), and a NaCl concentration twice or more as much as that for MgAl-LDH2 is needed, but there is sufficient decarbonation occurring. Nearly 100% weight was recovered with no or little weight reductions (with losses due to filtration and other operations factored in). From the results of powder XRD, the obtained basal spacing (25° C., 60% relative humidity) changed from an initial 0.756 nm to 0.729 nm (after decarbonation) (FIGS. 15($a$) and (b)). In the powder XRD profile of the product obtained by decarbonation, there was no diffractive reflection observed of the carbonate type starting material. There were similar changes in the FTIR profiles and basal spacing, indicating that this NiAl-LDH2, too, can be subjected to decarbonation by the acetic acid buffer/NaCl mixed solution, yielding $Cr^-$-containing NiAl-LDH2.

EXAMPLE 9

With a combination in which the metal ions Q and R in the general formula were Zn and Al ions, respectively, too, an experiment on decarbonation using an acetic acid buffer/NaCl solution was carried out.

The LDH was synthesized by the urea method. An aqueous solution (about 90 mL) containing 0.424 g of urea was added to an aqueous solution (about 90 mL) containing 0.273 g of zinc chloride and 0.241 g of aluminum chloride.hexahydrate, and the total amount of the resulting solution was adjusted to 200 mL, 150 mL of which were placed in a flask having a cooling tube, and heated and refluxed for 20 hours in an open system in an air atmosphere. After the reaction, the product was cooled, filtrated, washed with distilled water and ethanol, and dried in a vacuum, yielding white, powdery $Zn_2Al(OH)_6(CO_3^{2-})_{0.5} \cdot nH_2O$ (hereinafter abbreviated as ZnAl-LDH2) in 0.249 g (100% yield). The end product being obtained has been confirmed by XRD and FTIR.

Ten (10) ml of each of acetic acid buffer/NaCl mixed solutions comprising a 0.1 mol/L acetic acid buffer having an acetic acid ratio of 0.150 and having a NaCl concentration adjusted to 0 to 2.5 mol/L were added to 21.58 mg of ZnAl-LDH2 for reaction at 25° C. for 20 hours under mild shaking. Thereafter, the reaction product was filtrated and dried as in Example 1 to obtain white powders.

Figure 14:
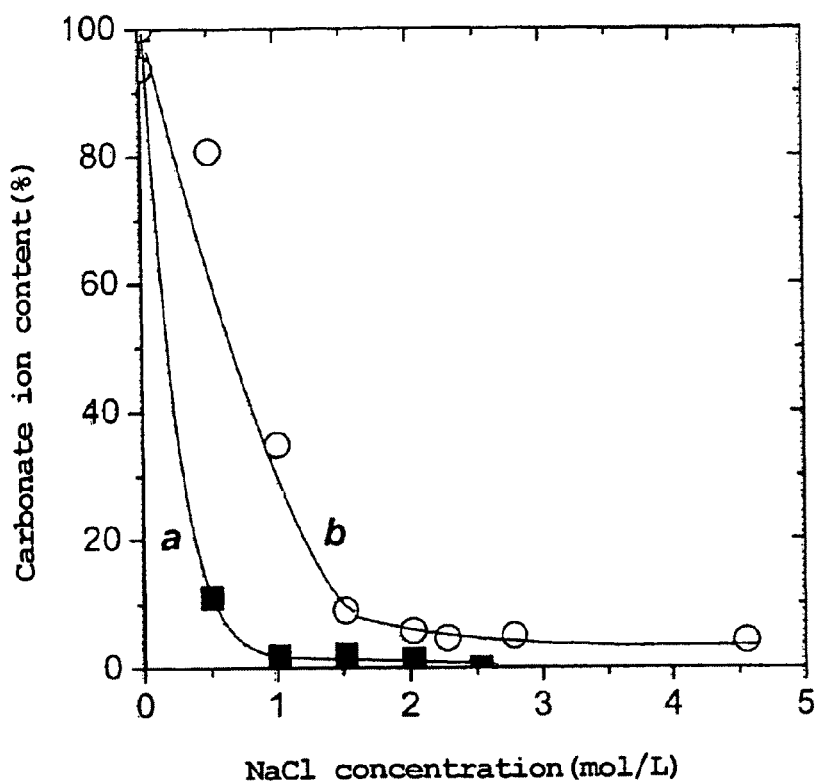
FIG. 14 is graphs illustrative of changes in the residual carbonate ion content under the action of solutions having varied NaCl concentrations on the acetic acid buffer (0.10 mol/L with an acetic acid ratio of 0.150) in the case of (a) ZnAl-LDH2 in Example 9 and (b) NiAl-LDH2 in Example 8.
Figure 15:
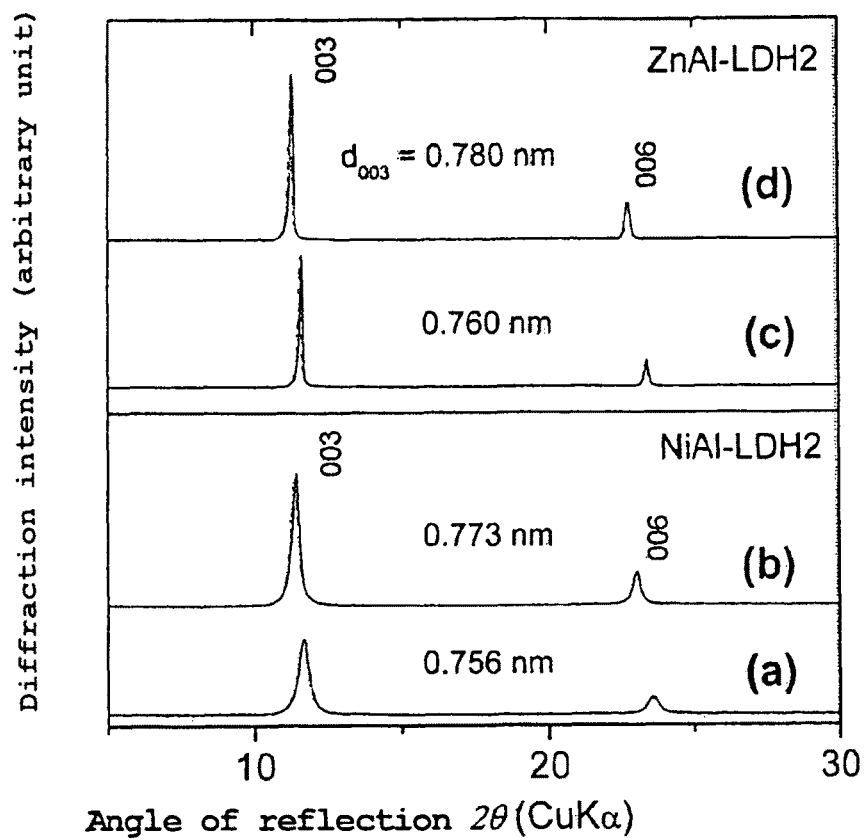
FIG. 15 is the powder X-ray diffraction profiles of decarbonated samples in Examples 8 and 9 in the case of (a) the starting carbonate type NiAl-LDH2, (b) NiAl-LDH2 (of the Cl⁻ type) after decarbonation, (c) the starting carbonate type ZnAl-LDH2 in the starting material, and (d) ZnAl-LDH2 (of the Cl⁻ type) after decarbonation. In the Cl⁻ LDH profiles after decarbonation, there was no starting material's peak remained whatsoever.

From the results of Fourier transform IR spectroscopy, the quantity of residual carbonate ions was estimated: at a NaCl concentration of 1 mol/L or greater, the residual carbonate ions were 5% or less, indicating that decarbonation occurred as much as the MgAl-LDH example (a in FIG. 14). Nearly 100% weight was recovered with no or little weight reductions (with losses due to filtration and other operations factored in). From the results of powder XRD, the obtained basal spacing (25° C., 60% relative humidity) changed from an initial 0.760 nm to 0.780 nm (after decarbonation) (FIGS. 15($a$) and (b)). In the powder XRD profile of the product obtained by decarbonation, there was no diffractive reflection observed of the carbonate type starting material. From the FTIR profiles and basal spacing, it has been found that this ZnAl-LDH2, too, can be subjected to decarbonation by the acetic acid buffer/NaCl mixed solution, yielding $Cr^-$-containing ZnAl-LDH2.

In the examples, ion exchanged water (degassed water) which has been boiled for removal of carbon dioxide is used, but it is not always necessary to use degassed water for solution preparation, because the decarbonated solution is of weak acidity and at that pH, nearly all of carbonate ions vanish off. However, degassed water is needed for filtration in general and a washing step in particular.

INDUSTRIAL APPLICABILITY

The present invention is of great significance, as already referred to in the "advantages of the invention". That is, the present invention makes it possible to obtain, in a shorter period of time, more readily and with greater safety, an anion-exchangeable LDH that could not easily be obtained so far in the art. And the obtained easy-to-anion exchange LDH itself could be used industrially: it could be used for separation and recovery of harmful anions from in drainage, separation and recovery of valuable anions from in water, separation and recovery of $CO_2$ from in exhaust gases, etc. In addition, the product, because of being of anion exchangeability, is expected to have wide applications in a variety of fields from now on. For instance, it would be possible to synthesize and provide an anion-exchangeable, functional organic molecule by the so-called soft chemical reaction involving a very simple operation such as an ion-exchange process, so leading to development and promotion of unheard-of substances having novel functions. It has already been proposed to insert bio-functional organic molecules between layers for protection purposes and drug delivery purposes.

The starting LDHs such as hydrotalcite containing anions are precipitated in the form of a flat plate-form crystal having a high aspect ratio, with the c-axis direction of the crystal vertical to the flat plate. Because a carbonate ion-containing LDH that has an easily controllable grain diameter and a high crystal aspect ratio and that is less likely to change in terms of shape and grain diameter by ion exchange can be used as the starting material, it is possible to synthesize an organic-inorganic composite having a controlled grain diameter, opening up a way of forming oriented films lined up in a specific direction. This could be extended to a novel applied field such as the construction of nanodevices by orderly oriented accumulation onto substrates (Non-Patent Publication 17, Patent Publication 3).

What we claim is:

1. A preparation method for preparing an anion-exchangeable, layered double hydroxide, comprising:
    dispersing a starting material in an aqueous solution mixed with a salt containing minus monovalent anions ($X^-$) in an amount sufficient to substitute a carbonate ion site thereby substituting the carbonate ion site while maintaining pH (hydrogen ion exponent) of the aqueous solution 4-7,
    wherein the starting material is a carbonate ion type layered double hydroxide (LDH) having a composition represented by a general formula: $Q_xR(OH)_z(CO_3^{2-})_{0.5-y/2}(X^-)_y \cdot nH_2O$,
    where x is indicative of a numeral range of $1.8 \leq x \leq 4.2$,
    z is indicative of $2(x+1)$,
    y is indicative of a minimum value of at least 0 that increases to less than 1 when anions ($X^-$) remain or a part of anions is introduced,
    Q is a divalent metal ion,
    R is a trivalent metal ion, and
    n is $2 \pm 2$, and
    y in said general formula increases to a maximum of 1 by substitution of the minus monovalent anion ($X^{-1}$) at the carbonate ion site.

2. The preparation method of claim 1, wherein said pH is regulated by mixing an acid and a buffer comprising a conjugate base thereof or a supply of an acid.

3. The preparation method of claim 2, wherein said pH is regulated by mixing acetic acid and the buffer comprising the conjugate base thereof or the supply of acetic acid.

4. The preparation method of claim 1, wherein the minus monovalent anion ($X^-$) is a chlorine ion.

5. The preparation method of claim 1, wherein a temperature of said aqueous solution is from room temperature to 100° C.

6. The preparation method of claim 1, wherein
the divalent metal ion Q in said general formula is at least one metal ion selected from the group consisting of Mg, Mn, Fe, Co, Ni, Cu, Zn, and Ca, and
the trivalent metal ion R in said general formula is at least one metal ion selected from the group consisting of Al, Ga, Cr, Mn, Fe, Co, Ni, and La.

* * * * *